(12) United States Patent
Kim et al.

(10) Patent No.: US 7,065,543 B2
(45) Date of Patent: Jun. 20, 2006

(54) APPARATUS AND METHOD FOR 2-D DISCRETE TRANSFORM USING DISTRIBUTED ARITHMETIC MODULE

(75) Inventors: Ig Kyun Kim, Taejon (KR); Kyung Soo Kim, Taejon (KR)

(73) Assignees: VK Corporation, Anyang-si (KR); Electronics and Telecommunications Research Institute, Daejon (KR)

( * ) Notice: Subject to any disclaimer, the term of this patent is extended or adjusted under 35 U.S.C. 154(b) by 507 days.

(21) Appl. No.: 10/183,401

(22) Filed: Jun. 28, 2002

(65) Prior Publication Data

US 2003/0078952 A1 Apr. 24, 2003

(30) Foreign Application Priority Data

Sep. 28, 2001 (KR) ............................... 2001-60467

(51) Int. Cl.
*G06F 17/14* (2006.01)
(52) U.S. Cl. .................................................... 708/402
(58) Field of Classification Search ................. 708/402
See application file for complete search history.

(56) References Cited

U.S. PATENT DOCUMENTS 4,899,300 A 2/1990 Jutand et al.
5,331,584 A 7/1994 Kitsuki et al.
5,357,453 A 10/1994 Kim et al.
5,764,553 A * 6/1998 Hong ......................... 708/400

FOREIGN PATENT DOCUMENTS

| KR | 2000-31963 | 6/2000 |
| KR | 2001-59970 | 7/2001 |
| KR | 2001-60467 | 6/2004 |

* cited by examiner

*Primary Examiner*—D. H. Malzahn
(74) *Attorney, Agent, or Firm*—Mayer, Brown, Rowe & Maw LLP (57) ABSTRACT

The present invention relates to a distributed arithmetic module employing a zero input detection circuit that reduces electric power consumption by avoiding unnecessary calculation. An apparatus for performing a discrete cosine transform (DCT) on a video signal, including; input unit for receiving the video signal in a block by block basis; discrete cosine transform (DCT) unit for receiving each image data block from the input unit and conducting a discrete cosine transform/inverse discrete cosine transform (DCT/IDCT) operation on the received image data block to generate a transformed image data block containing N×M pixel value; zero input detect unit for determining whether pixel values of a current image data block are all "0" and generating a detection signal in order to bypass the DCT/IDCT performing on the current image block; and output unit for outputting the transformed image data block as a transformed video signal.

15 Claims, 5 Drawing Sheets

APPARATUS AND METHOD FOR 2-D DISCRETE TRANSFORM USING DISTRIBUTED ARITHMETIC MODULE

FIELD OF THE INVENTION

The present invention relates to a distributed arithmetic module equipped with a zero input detection circuit that reduces electric power consumption by bypassing a computing block of a circuit when inputted data bits are all "0", and an apparatus and method for two-dimensional discrete cosine transform (2-D DCT) using the distributed arithmetic module.

DESCRIPTION OF RELATED ARTS

The discrete cosine transform (DCT) is a technology used in an application field such as compression and restoration of an image signal by converting the image signal from information in a spatial domain to information in a frequency domain and vice versa.

Considering a battery life and a circuit property, a structure that can reduce power consumption is called for in order to embody an integrated circuit, which is applicable to portable devices.

Generally, the DCT apparatus is a core functional element that processes input images in an application employing an image compression integrated circuit.

Also, the DCT apparatus has blocks with far more amount of calculation than the other functional blocks, thus bringing on an increase in electric power consumption.

The increase of power consumption causes not only a chip heating, but also a voltage drop like a noise by bouncing between the input voltage (Vdd) and the ground connection (GND).

Therefore, in order to improve the property of an image process integrated circuit, the power consumption should be reduced and thus the above-mentioned problem should be solved.

Recently, a chip with low power consumption is called for in order to increase the operating time and make a battery small for portable devices. Also, as the process for fabricating a very large scale integration (VLSI) develops, the number of the gates increases and the operating frequency becomes higher. Therefore, the overall power consumption of an image process integrated circuit can be reduced by reducing the amount of calculation in the DCT.

Meanwhile, the power consumption of a chip can be calculated and analyzed by using the mathematical equation as follows:

$$PC = CV_{dd}V_{swing}fp \qquad \text{Eq. 1}$$

wherein, "PC" denotes a power consumption; "C", a load capacitance according to the size of a substrate; "$V_{dd}$", a supply voltage; "$V_{swing}$", a signal swing; "f", an operating frequency; and "P", an activation probability" respectively.

The power consumption can be reduced by decreasing the load capacitance (C), the supply voltage (V), operating frequency (f), activation probability (p). In accordance with the present invention, however, tries to obtain the same effect by reducing the activation probability (p) by composing a discrete cosine transform (DCT) circuit that can make data bypass according to conditions. Here, the method for the discrete cosine transform (DCT) is a real-valued frequency transform, which is similar to a discrete Fourier transform (DFT).

When applied to an image block sized L×L pixels, a two-dimensional DCT can be represented as follows:

$$Y_{k,l} = \sum_{i=0}^{L-1} \sum_{j=0}^{L-1} x_{i,j} \cdot C_{k,l} \cdot \cos\frac{(2j+1)K\pi}{2L} \cdot \cos\frac{(2j+1)K\pi}{2L} \qquad \text{Eq. 2}$$

where K=0, 1, ..., L−1
l=0, 1, ..., L−1

$$C_{k,j} = \begin{cases} 1/2; k = l = 0 \\ 1/\sqrt{2}; k = 0 \vee l = 0 \\ 1; \text{othercases} \end{cases}$$

wherein, (i,j) denotes coordinates of the pixels in an initial block, whereas (k,l) represents coordinates of the coefficients in the initial block. Also, $X_{i,j}$ stands for each pixel value in the initial block and $Y_{k,l}$ denotes a each coefficient value in a transformed block, respectively.

When 2-D DCT of a length L is calculated from the Eq. 2, "L=4" of an addition and a multiplication should be conducted. Also, when implementing a 2-D DCT in a direct form method, the implemented circuit may be complicated as a 64 tap digital filter.

Meanwhile, one important factor in implementing a VLSI of 2-D DCT is a separativeness.

The separativeness can be implemented in a method shown below. That is, one-dimensional (1-0) DCT of a length L is first conducted on the row successively, and then a 1-D DCT is carried out on the result column. The 1-D DCT of an L-point is as follows:

$$Y_k = \sum_{i=0}^{L-1} x_i \cdot C_k \cdot \cos\frac{(2i+1)K\pi}{2L} \qquad \text{Eq. 3}$$

where k=0, 1, ..., L−1.

$$Ck, l = \begin{cases} 1/\sqrt{2}; k = 0 \\ 1; \text{othercase} \end{cases}$$

When calculating a separate horizontal 1-D DCT and a separate vertical 1-D DCT of a length L from the Eq. 3, addition and multiplication operations of $2L^3$ should be done.

To reduce the amount of calculation, compared with a direct 2-D implementation, separate horizontal and separate vertical 1-D DCT methods are generally used.

Several DCT algorithms are compared in the aspect of the amount of calculation and the required memory capacity.

TABLE 1

| Additions, multiplications and ROM space are represented in a 16-bit word basis | Number of Multiplications | Number of Additions | Number of ROM words | Number of RAM Words for Transposition |
|---|---|---|---|---|
| per L × L block | | | | |
| Direct Calculation | $L^4$ | $L^4$ | — | — |
| One with separability | $2L^3$ | $2L^3$ | — | $L^2$ |
| Fast Algorithm | $= L^2 \log_2 L$ | $= L^2 \log_2 L$ | — | $L^2$ |
| Pure D.A | — | 32L | $2*L*2^L$ | $L^2$ |
| Mixed D.A./F.G. | — | 34L | $L*2^{L/2}$ | $L^2$ |
| per pixel | | | | |
| Direct Calculation | $L^2$ | $L^2$ | — | — |
| One with eparability | 2L | 2L | — | $L^2$ |
| Fast Algorithm | $\log_2 L$ | $2\log_2 L$ | — | $L^2$ |
| Pure D.A | — | 32/L | $2*L*2L$ | $L^2$ |
| Mixed D.A./F.G. | — | 34/L | $L*2^{L/2}$ | $L^2$ |

As shown in Table 1, reducing the amount of calculation is the key factor for decreasing power consumption, through there is a little difference among the structures.

In short, for discrete cosine transform (DCT), a great deal of calculation and fast processing speed are required. Therefore, in case of implementing an integrated circuit, there is a problem that electric power is consumed a lot in the DCT circuit due to many numbers of times of calculation and data transition.

SUMMARY OF THE INVENTION

It is, therefore, an object of the present invention to provide a distributed arithmetic module that can reduce electric power consumption at the distributed arithmetic circuit of a discrete cosine transform (DCT) apparatus which requires much amount of calculation by being equipped with a zero input detection circuit that reduces power consumption and receiving and calculating effective data among the input data, and an apparatus and method for two-dimensional discrete cosine transform (2-D DCT) using the distributed arithmetic module.

In accordance with one embodiment of the present invention, there is provided an apparatus for performing a discrete cosine transform (DCT) on a video signal, wherein the video signal includes a plurality of N×M image blocks, N and M being a positive integers, including: input unit for receiving the video signal in a block by block basis; discrete cosine transform (DCT) unit for receiving each image data block from the input unit and conducting a discrete cosine transform/inverse discrete cosine transform (DCT/IDCT) operation on the received image data block to generate a transformed image data block containing N×M pixel value; zero input detect unit for determining whether pixel values of a current image data block are all "0" and generating a detection signal in order to bypass the discrete cosine transform/inverse discrete cosine transform (DCT/IDCT) performing on the current image block; and output unit for outputting the transformed image data block as a transformed video signal.

In accordance with another embodiment of the present invention, there is provided a method for performing a discrete cosine transform (DCT) on a video signal, wherein the video signal includes a plurality of N×M image blocks, N and M being a positive integers, including the steps of: a) receiving the video signal in a block by block basis; b) receiving the each image data block as a serial data by selecting from a serial data of a new image data block from external or a serial data of the transformed image data block fed back from the output means; c) converting the received serial data to parallel data; d) storing the parallel data; e) examining the stored data and determining whether or not bits of the stored data are all "0"; f) if bits of the data are all "0", bypassing a discrete cosine transform/inverse discrete cosine transform (DCT/IDCT) operation performing on the stored data; and g) if the bits of the data are not all "0", performing the discrete cosine transform/inverse discrete cosine transform (DCT/IDCT) operation on the stored data.

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from following descriptions of the embodiments with reference to the accompanying drawings, which is set forth hereinafter.

Figure 1:
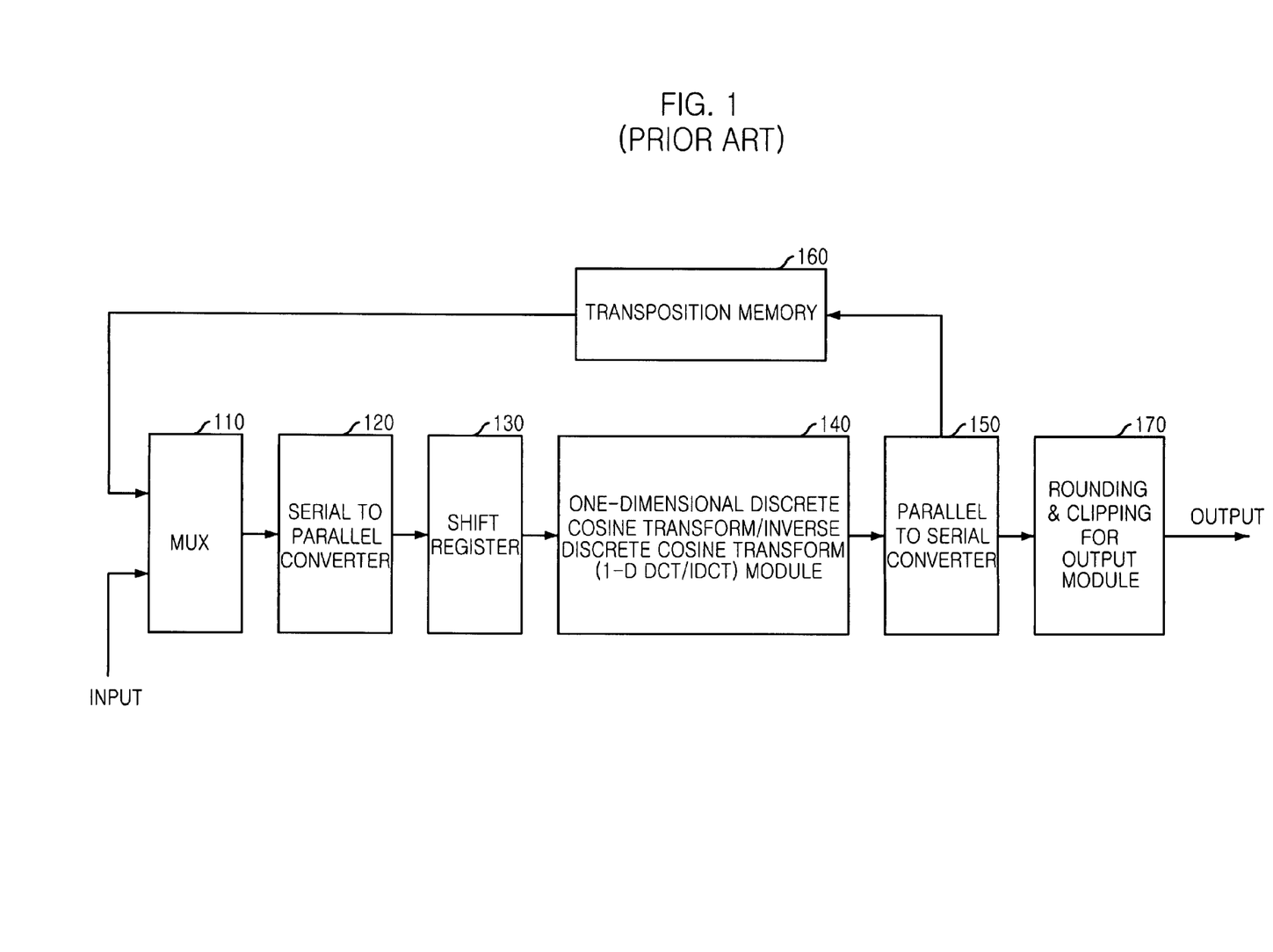
FIG. 1 is a block diagram showing a configuration of a conventional discrete cosine transform (DCT) apparatus.

FIG. 1 is a block diagram showing a configuration of a conventional discrete cosine transform (DCT) apparatus.

In the drawing, the reference numeral "11O" denotes a multiplexer (MUX); "120", a serial to parallel converter; "130", a shift register; "140", a one-dimensional discrete cosine transform/inverse discrete cosine transform (1-D DCT/IDCT) module; "150", a parallel to serial converter; "160", a transposition memory; and "170", a rounding & clipping for output module, respectively.

As a row-column calculation method is used, when an 8×8 pixel block is inputted, a 1-D DCT/IDCT is performed in the row direction, and then a transposition is conducted passing through a transposition memory. After that, a 1-D DCT/IDCT is performed in the column direction and the result is outputted.

One path of DCT/IDCT can be determined by a conventional DCT/IDC selector (not shown).

A multiplexer (MUX) 110 selects input data and serves to control the input data format.

In case of DCT, data are inputted for a row direction of 1-D DCT. The result data of the 1-D DCT, that is, transpositioned data are, again, inputted to a 1-D DCT/IDCT module 140 for a column direction DCT through a parallel to serial converter 150, a transposition memory 160, a mux 110, a serial to parallel converter 120, a rounding & clipping for output 170 and a 1-D DCT/IDCT. Their result data are outputted as DCT coefficients.

In case of a IDCT path, data are inputted for a row direction 1-D DCT. The result data of the 1-D DCT, that is, transpositioned data are inputted to the 1-D DCT/IDCT module 140 for a column direction 1-D DCT same the above. Their result data are outputted as DCT coefficients.

Values represented as a in the below Eq. 4 and Eq. 5 are input pixel data and b is a processed DCT coefficient. The 8-point IDCT can be represented as follows:

$$\frac{1}{2}\begin{pmatrix} a_0 + a_7 \\ a_1 + a_6 \\ a_2 + a_5 \\ a_3 + a_4 \end{pmatrix} = \begin{pmatrix} \cos4\theta & \cos2\theta & \cos4\theta & \cos6\theta \\ \cos4\theta & \cos6\theta & -\cos4\theta & -\cos2\theta \\ \cos4\theta & -\cos6\theta & -\cos4\theta & \cos2\theta \\ \cos4\theta & -\cos2\theta & \cos4\theta & -\cos6\theta \end{pmatrix} \begin{pmatrix} b_0 \\ b_2 \\ b_4 \\ b_6 \end{pmatrix} \quad \text{Eq. 4}$$

$$\frac{1}{2}\begin{pmatrix} a_0 - a_7 \\ a_1 - a_6 \\ a_2 - a_5 \\ a_3 - a_4 \end{pmatrix} = \begin{pmatrix} \cos\theta & \cos2\theta & \cos5\theta & \cos7\theta \\ \cos3\theta & -\cos7\theta & -\cos\theta & -\cos5\theta \\ \cos5\theta & -\cos\theta & \cos7\theta & \cos3\theta \\ \cos7\theta & -\cos5\theta & \cos3\theta & -\cos\theta \end{pmatrix} \begin{pmatrix} b_1 \\ b_3 \\ b_5 \\ b_7 \end{pmatrix} \quad \text{Eq. 5}$$

Figure 2:
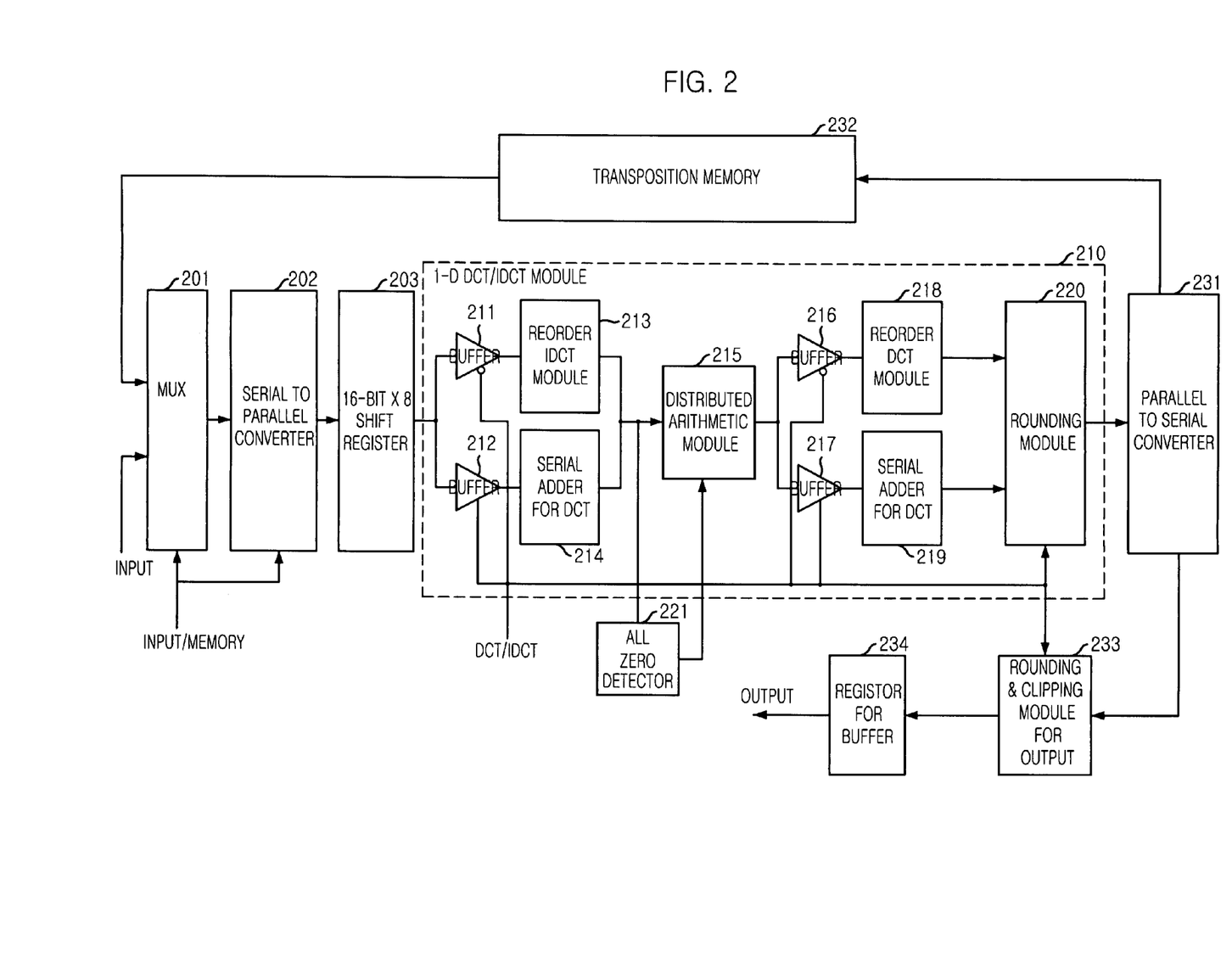
FIG. 2 is a block diagram illustrating a configuration of discrete cosine transform (DCT) apparatus in accordance with the present invention.

FIG. 2 is a block diagram illustrating a configuration of a discrete cosine transform (DCT) apparatus in accordance with the present invention.

A distributed arithmetic method can repeatedly same hardwires while performing a different DCT operation.

In accordance with the present invention, the power consumption can be effectively reduce by applying a zero input detection circuit to the distributed arithmetic circuit.

The distributed arithmetic method is used for implementing a DCT. The distributed arithmetic method will be briefly described, hereinafter.

It is supposed that a variable X is obtained from the following equation by using other variables.

$$X = C_0 Y_0 + C_1 Y_1 + C_2 Y_2 + C_3 Y_3 \quad \text{Eq. 6}$$

where in case the variables $Y_0, Y_1, Y_2, Y_3$ are represented with n-bit 2's complement, Yi ($0 \leq I \leq 3$) is expressed as shown follows:

$$Y_i = -2^{n-1} y_i^{n-1} + 2^{n-2} y_i^{n-2} + \ldots + 2 y_i^1 + y_i^0 \quad \text{Eq. 7}$$

Wherein, X can be represented as shown in Eq.8.

$$\begin{aligned}
X = & -2^{n-1} y_0^{n-1} C_0 + 2^{n-2} y_0^{n-2} C_0 + \ldots + 2 y_0^1 C_0 + y_0^0 C_0 - \\
& 2^{n-1} y_1^{n-1} C_1 + 2^{n-2} y_1^{n-2} C_1 + \ldots + 2 y_1^1 C_1 + y_1^0 C_1 - \\
& 2^{n-1} y_2^{n-1} C_2 + 2^{n-2} y_2^{n-2} C_2 + \ldots + 2 y_2^1 C_2 + y_2^0 C_2 - \\
& 2^{n-1} y_3^{n-1} C_3 + 2^{n-2} y_3^{n-2} C_3 + \ldots + 2 y_3^1 C_3 + y_3^0 C_3 \\
= & y_0^0 C_0 + y_1^0 C_1 + y_2^0 C_2 + y_3^0 C_3 + 2(y_0^1 C_0 + y_1^1 C_1 + y_2^1 C_2 + y_3^1 C_3) \\
& \ldots + 2^{n-2}(y_0^{n-2} C_0 + y_1^{n-2} C_1 + y_2^{n-2} C_2 + y_3^{n-2} C_3) - \\
& 2^{n-1}(y_0^{n-1} C_0 + y_1^{n-1} C_1 + y_2^{n-1} C_2 + y_3^{n-1} C_3)
\end{aligned} \quad \text{Eq. 8}$$

From the above equations, if the values of $$\sum_{i=0}^{3} y_i^k C_i$$

are calculated for all the possible case of $y_i^k$ and stored in the ROM, the value of $$2^k \sum_{i=0}^{3} y_i^k C_i$$

can be obtained easily. A desired value can be obtained finally by performing the repeatedly by a predetermined number.

A circuit for obtaining the value of Eq. 8 in shown in FIG. 5 and will be described in detail hereinafter.

Referring back to FIG. 2, a discrete cosine transform (DCT) apparatus in accordance with the present invention includes: a multiplexer (MUX) 201 for selecting one of the external input and the input from a transposition memory 232; a serial to parallel converter 202 for converting serial data outputted from the multiplexer 201 into parallel data; a 16-bit×8 shift register 203 for loading the data outputted from the serial to parallel converter 202 in parallel; a one-dimensional discrete cosine transform/inverse discrete cosine transform (1-D DCT/IDCT) module 210 for conducting DCT/IDCT on the data outputted from the shift register 203; an all zero detector 221 for examining the data inputted to the 1-D DCT/IDCT 210 and if the inputted bits are all "0", bypassing the data of "0" from 1-D DCT/IDCT 210; a parallel to serial converter 231 for converting the parallel data outputted from the 1-D DCT/IDCT 210 to serial data; a transposition memory 232 for storing the data outputted from the parallel to serial converter 231; a rounding & clipping module 233 for conducting rounding and clipping to output the data from the parallel to serial converter 231; and a register 234 for temporarily storing the data outputted from the rounding & clipping module 233.

Also, the 1-D DCT/IDCT 210 includes: buffers 211, 212 for temporarily storing the data outputted from the shift register 203; a reorder inverse discrete cosine transform (IDCT) module 213 for readjusting the order of data outputted from the buffer 211; a first serial adder 214 for conducting an addition operation on the data outputted from the buffer 212 for DCT; a distributed arithmetic module 215 for conducting a distributed arithmetic operation on the data outputted from the serial adder 214; buffers 216, 217 for temporarily storing the data outputted from the distributed arithmetic module 215; a reorder DCT module 218 for readjusting the order of data outputted from the buffer 216; a second serial adder 219 for conducting an addition on the data outputted from the buffer 217 for IDCT; and a rounding module 220 for rounding off the data outputted from the reorder DCT module 218 and the second serial adder 219.

For the sake of convenience, the 8×8 DCT/IDCT apparatus are described hereinafter in detail.

First of all, the multiplexer 201 selects one of the external input and the input from the transposition memory 232. This is because the structure of the 2-D DCT is implemented in a row-column separation method.

The external input data are 9 bits in case of DCT and 12 bits in case of IDCT, whereas the inputs from the transposition memory 232 are 15 bits×2.

The 2-D DCT/IDCT is completed, after a row direction DCT is performed and then column direction DCT is conducted on this import data. The serial to parallel converter 202 is composed of eight number of 15-bit registers and outputs serial data in parallel. The shift register is composed of eight number of 16-bit registers. It loads data from the serial to parallel converter 202 in parallel and sends the data into the 1-D DCT/IDCT 210. At this moment, as the output of the serial to parallel converter 202 is 15 bits while being loaded in parallel, it is made into a 16-bit data by inserting "0" to the least significant bit (LSB).

The 16-bit data is splitted into eight number of 2-bit data and inputted the 1-D DCT/IDCT 216. Therefore, after being loaded with data from the serial to parallel converter 202 in parallel, the shift register 203 shifts the data in the right by two bits and outputs 2-bit data.

The all zero detector 221 is used in reducing power consumption by bypassing part of the 1-D DCT/IDCT module2 10, when the inputted bits are all of "0".

After examining if the input data towards the distributed arithmetic module 215 of the 1-D DCT/IDCT 210 are all "0" and in case they are all "0", the all zero detector 221 reads data from the ROM (not shown) and bypasses a module that performs an addition and obtains the sum of the data. The addition is implemented by OR-ing all the 16 input data bits.

The reorder IDCT module 213 and the reorder DCT module 218 carries out the function changing the order of IDCT inputs, because the order is not the one of x0, x1, x2, . . . , x7 but the one of x0, x4, x6, x2, x1, x3, x5, x7. Also, the output of the DCT is changed by the reorder DCT module 218, as the order is not the one of x0, x1, x2, . . . , x7 but the one of x0, x4, x6, x2, x1, x3, x5, x7.

The 1-D DCT module performs an addition operation_prior to the distributed arithmetic module 215, and it is the first serial adder for DCT 214 that conducts this function.

Also, The 1-D IDCT performs an addition posterior to the distributed arithmetic module 215, and it is the second serial adder for IDCT 219 that conducts this function. The distributed arithmetic module 215 takes in charge of multiplication of the 1-D DCT/IDCT module 210.

Since the DCT and the IDCT can use the same ROM table, the distributed arithmetic module 215 is the same for both case of DCT and IDCT.

The operation of the transposition memory 232 is explained as follows.

In case of input operation, as a result of the row or column direction 1-D DCT/IDCT, total eight number of 15-bit data are inputted at a first clock and at a second clock, the transposition memory 232 remains no operation state so as to allow a reading operation of the serial to parallel converter 202. Also, at a next clock, another two data is written, while another clock. It remains no operation state for the serial to parallel converter 202. This process goes on and on until all the eight data are read and written into the transposition memory 232.

In case of output operation, two of eight number of the 15-bit data are read sequentially, while the data are not written in the input operation. For the input and output operations of the next data block, in the DCT/IDCT of a 8×8 data block, if the direction of writing data in the transposition memory 232 is horizontal, in the next 8×8 data block, data are written in the transposition memory 232 in the vertical direction. This writing operation is for pipelining operation.

Meanwhile, the rounding module 220 for the IDCT 220 performs the function of rounding off data so as to use the 1-D IDCT result as input data into the transposition memory 232. Also, the rounding module 220 for DCT carries out the function of rounding off data so that the 1-D DCT result can be used as input data into the transposition memory 232, which is similar to the function of the rounding module 220 f or IDCT.

Subsequently, the rounding & clipping for output module 233 performs the function of rounding off and clipping data for outputting. Each of its input data is composed of 15 bits, whereas each of its output is composed of 12 bits in case of DCT, and 9 bits, in case of IDCT.

In other words, the DCT apparatus in accordance with the present invention further equips a zero input detection circuit to a distributed arithmetic circuit constituting a conventional DCT circuit, examines the bit composition of input data, and if the bits are all zero, bypasses a DCT operation circuit which requires a great deal of calculation, that is, a module that reads data from the ROM and summing them up. This way, the signal activity, which is one element for consuming the power, is decreased and thus the power consumption at the DCT circuit can be effectively reduced.

Figure 3:
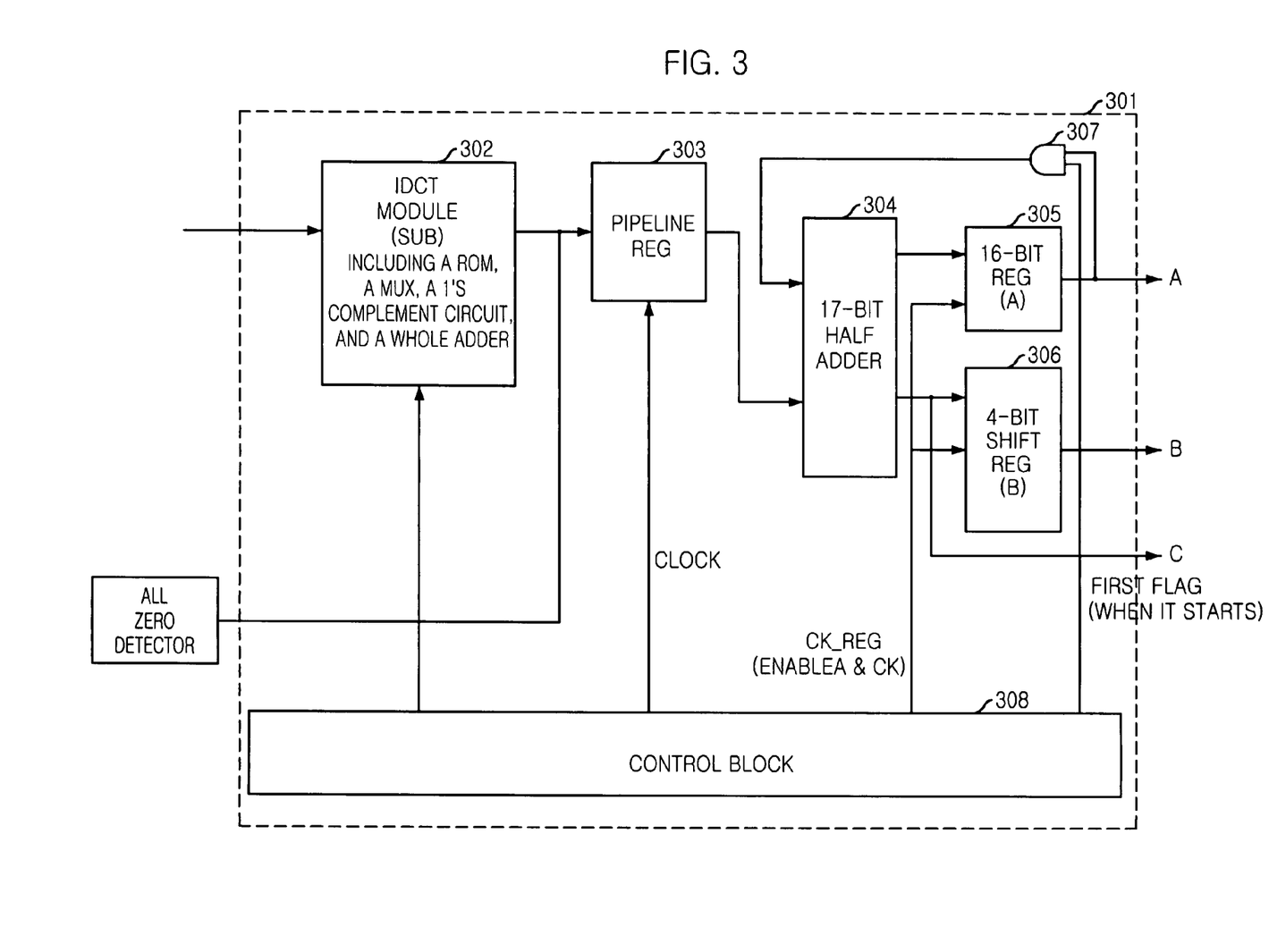
FIG. 3 is a block diagram depicting a detailed configuration of a distributed arithmetic module of the present invention.

FIG. 3 is a block diagram depicting a detailed configuration of a distributed arithmetic module in accordance with an embodiment of the present invention.

As shown in FIG. 3, the distributed arithmetic module 301 comprises: an IDCT module 302 for conducting an IDCT operation with the data outputted from the reorder IDCT 213 in FIG. 2; a pipeline register 303 for assisting the calculation of the IDCT module 302; a 17-bit half adder 304 for receiving and half-adding the outputs of the pipeline register 303 and the distributed arithmetic module; a 16-bit register (REG) (A) 305 and a 4-bit shift register (REG) (B) 306 for temporarily storing the data outputted from the 17-bit half adder 304; a control block 308 for controlling the distributed arithmetic module; and a logical multiplier 307 for logically multiplying the output data of the control block 308 and the distributed arithmetic module.

The distributed arithmetic module for multiplying even coefficients has an input of two, for example an input of y0, y4 or y2, y6, whereas the distributed arithmetic module for odd coefficients has an input of four, for instance, an input of y1, y3, y5, y7.

Referring to FIG. 3, the distributed arithmetic module for multiplying even coefficients will be described hereinafter.

Two 2-bit data (y0, y4 or y2, y6) are inputted to the ROM (not shown) contained in the IDCT module 302. Here, in case the values of the 16 bits are all "0", the data bypass the IDCT module 302 by using the all zero detector 221 in FIG. 2 and, therefore, the unnecessary calculations are avoided. Here, the IDCT module 302 includes two ROMs, a multiplexing (MUX) circuit, a circuit of 1's complement and a 15-bit whole adder.

Meanwhile, the pipeline register 303 is prepared for a case when the operation of the 15-bit whole adder provided with the IDCT module 302 cannot be performed within one clock. It also carries out a serial addition along with the output registers, i.e., the REG (A) 308 and the REG (B) 309. The two output REGs (A)(B), 308, 309 and the least significant two bits (LSB) are used differently according to the operation of the IDCT and the DCT. For instance, in case of the IDCT, the register (B) 309 is not used and the register (A) 308 and the least significant two bits are used. The register (A) 308 includes the most significant bit (MSB) of the calculation result and inputted directly to the rounding module 220, whereas the least significant two bits (LSB) are inputted to the serial adder 219. After eight clocks, the final result is obtained by adding the result of the serial addition to the register (A) 308, and a rounding operation is performed.

In case of DCT, the least significant two bits (LSB) are not used and the register (A) 308 and the register (B) 309 are inputted into the rounding module 220.

Also, in DCT, the serial addition is carried out prior to the distributed arithmetic module 215 in FIG. 2.

The output A of the distributed arithmetic module is inputted to the DCT/IDCT rounding control circuit; the output B to the DCT rounding control circuit; and the output C to the serial adder 219 for IDCT.

Figure 4:
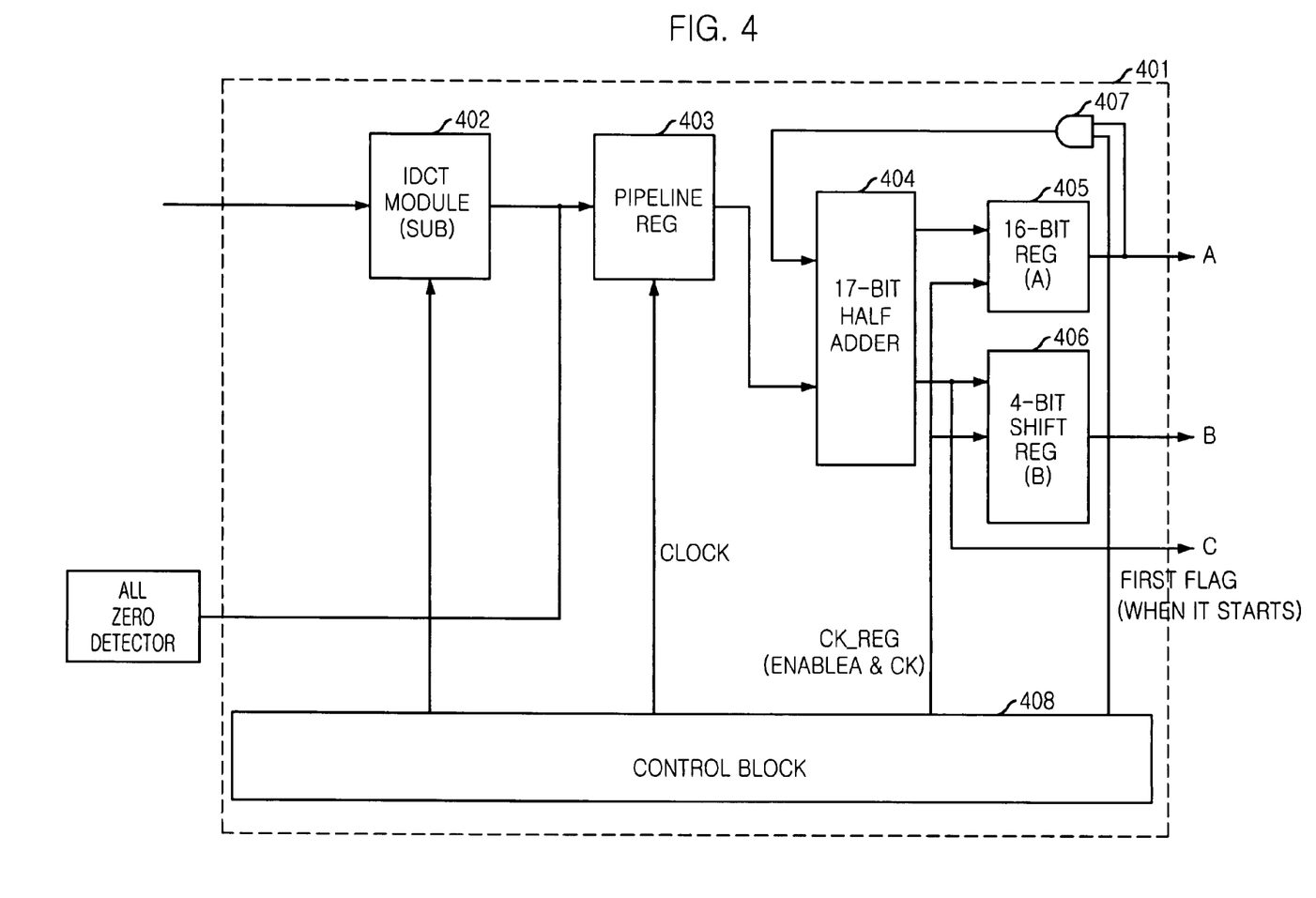
FIG. 4 is a block diagram describing a detailed configuration of a distributed arithmetic module in accordance with another embodiment of the present invention.

FIG. 4 is a block diagram describing a detailed configuration of a distributed arithmetic module in accordance with another embodiment of the present invention.

As shown, the distributed arithmetic module 401 comprises: an IDCT module 402 for conducting an IDCT operation with the data outputted from the reorder IDCT module 213 in FIG. 2; a pipeline register 403 for assisting the calculation of the IDCT module 402; a 17-bit half adder 404 for receiving and half-adding the output from the pipeline register 403 and from the distributed arithmetic module; a 16-bit register (REG) (A) 405 and a 4-bit shift register (REG) (B) 406 for temporarily storing the data outputted from the 17-bit half adder 404; a control block 408 for controlling the distributed arithmetic module; and a logical multiplier 407 for logically multiplying the output data of the control block 408 and the distributed arithmetic module.

As described above, the distributed arithmetic module in charge of multiplying even coefficients has an input of two, for example, an input of y0, y4 or y2, y6, whereas the distributed arithmetic module for odd coefficients has an input of four, for instance, an input of y1, y3, y5, y7.

Referring to FIG. 4, the distributed arithmetic module that takes in charge of multiplying odd coefficients will be described hereinafter.

The data inputted to the ROM module are the same as those shown in FIG. 3, just except that four 2-bit data (y1, y3, y5, y7) are inputted.

At the moment, in case the values of the 16 bits are all "0", the data bypass the thus IDCT module 402 by using the all zero detector 221 in FIG. 2 and the unnecessary calculation is avoided.

Figure 5:
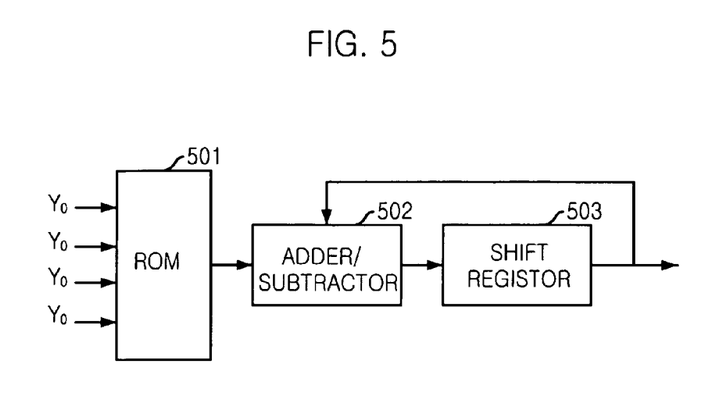
FIG. 5 is a block diagram illustrating a detailed configuration of a distributed arithmetic module.

FIG. 5 represents a circuit for obtaining the value of Eq. 8. The connection of the ROM 501, the adder/subtractor (accumulator) 502 and the shift register (SR) 503 is called a ROM and accumulator in cascade (RAC), and it is the basic elements for distributed arithmetic process. It will not be described inhere, as it is known to those skilled in the art of this invention.

In accordance with the present invention, power consumption is effectively reduced by not conducting unnecessary calculations when implementing the DCT apparatus in an integrated circuit. Also, it employs a zero input detection circuit to a distributed arithmetic circuit, which is a major component of the DCT apparatus that requires a great deal of calculation, and if values of the input data are all composed of "0", bypasses a circuit composed of a ROM, a MUX circuit, a circuit of 1's complement and a 15-bit whole adder. This way, it can reduce the electricity consumed in the DCT circuit that processes most calculations in an integrated circuit for image compression/restoration.

Although this invention is described in one or more embodiments, the present invention can be implemented as a program stored in a computer-readable recording medium such as CD ROMs, RAMs, ROMs, floppy disks, hard disks, optical-magnetic disks and thus likes.

The present invention can also expand the application range by improving the properties of a 2-D DCT apparatus and improve its performance, because the power consumption can be reduced efficiently when implementing an integrated circuit, compared to a conventional circuit.

While the present invention has been described with respect to certain preferred embodiments, it will be apparent to those skilled in the art that various changes and modifications may be made without departing from the scope of the invention as defined in the following claims.

What is claimed is:

1. An apparatus for performing a discrete cosine transform (DCT) on a video signal, wherein the video signal includes a plurality of N×M image blocks, N and M being a positive integer, the apparatus comprising:
   input means for receiving the video signal in a block by block basis;
   discrete cosine transform (DCT) means for receiving each image data block from the input means and conducting a discrete cosine transform/inverse discrete cosine transform (DCT/IDCT) operation on the received image data block to generate a transformed image data block containing N×M pixel values, wherein N and M are both positive integers and at least one of N and M is greater than 1;
   zero input detect means for determining whether pixel values of a current image data block are all "0" and generating a detection signal in order to bypass the discrete cosine transform/inverse discrete cosine transform (DCT/IDCT) performing on the current image block; and
   output means for outputting the transformed image data block as a transformed video signal.

2. The apparatus as recited in claim 1, wherein the output means includes:
   a second conversion means for receiving a transformed image data block from the discrete cosine transform (DCT) means and for converting the parallel data outputted from the operation means to serial data;
   a transposition data storage means for receiving the serial data from the second conversion means, transpositioning and storing the serial data outputted from the second conversion means to generate the video signal; and
   a rounding and clipping means for rounding off and clipping the serial data outputted from the second conversion means to generate the video signal.

3. The apparatus as recited in claim 1, wherein the input means includes:
   multiplex means for receiving said each image data block as a serial data by selecting from a serial data of a new image data block from external or a serial data of the transformed image data block fed back from the output means;

first conversion means for converting the serial data received from the multiplexing means to parallel data; and storage means for loading and temporarily storing the parallel data outputted from the first conversion means in parallel.

4. The apparatus as recited in claim 3, wherein the discrete cosine transform means includes:

first temporary storage means for temporarily storing the parallel data outputted from the storage means for performing the discrete cosine transform (DCT) operation;

reorder IDCT means for readjusting an order of the parallel data outputted from the first temporary storage means for performing the inverse discrete cosine transform (IDCT) operation;

first serial addition means for adding the parallel data outputted from the first temporary storage means for the DCT operation;

distributed arithmetic means for conducting distributed arithmetic operation on the parallel data outputted from the reorder IDCT means and the serial addition means;

second temporary storage means for temporarily storing the processed data outputted from the distributed arithmetic means;

reorder DCT means for readjusting an order of the data outputted from the second temporary storage means for the DCT operation;

second serial addition means for adding the data outputted from the second temporary storage means for the IDCT; and rounding means for rounding off the data outputted from the reorder DCT means and the second serial addition means.

5. The apparatus as recited in claim 4, wherein the distributed arithmetic means includes:

IDCT means for receiving the parallel data from the reorder IDCT means and the detection signal from the zero input detect means and for either performing an inverse discrete cosine transform (IDCT) operation on the received image data or bypassing the inverse discrete cosine transform (IDCT) operation performing on the received parallel data according to the received detection signal;

data processing means for receiving the processed image data, which is either transformed image data or bypassed image data, from the IDCT means, processing the received image data to be suitable to the DCT/IDCT operation; and a control means for controlling the distributed arithmetic module.

6. The apparatus as recited in claim 5, wherein said IDCT means performs the IDCT on the received parallel data when the zero detect means determines the received parallel data containing not all "0" bits and does not perform the IDCT on the received parallel data when the zero detect means determines the received parallel data containing all "0".

7. The apparatus as recited in claim 5, wherein the data processing means further includes:

a delay means for delaying time in case the calculation of the IDCT means cannot be performed within a predetermined clock;

a half addition means for receiving and half-adding the output data of the IDCT means and the final output data of the distributed arithmetic means; and a storage means for temporarily storing the data outputted from the half addition means.

8. The apparatus as recited in one of claim 5, wherein the IDCT means further includes a ROM, a multiplexing (MUX) circuit, a circuit for 1's complement and a whole adder, and reads data from the ROM and sum them up.

9. An method for performing a discrete cosine transform (DCT) on a video signal, wherein the video signal includes a plurality of N×M image blocks, N and M being a positive integers, the method comprising the steps of:

a) receiving the video signal in a block by block basis;

b) receiving said each image data block as a serial data by selecting from a serial data of a new image data block from external or a serial data of the transformed image data block fed back from the output means;

c) converting the received serial data to parallel data;

d) storing the parallel data;

e) examining the stored data and determining whether or not bits of the stored data are all "0";

f) if bits of the data are all "0", bypassing a discrete cosine transform/inverse discrete cosine transform (DCT/IDCT) operation performing on the stored data; and g) if the bits of the data are not all "0", performing the discrete cosine transform/inverse discrete cosine transform (DCT/IDCT) operation on the stored data;

wherein N and M are both positive integers and at least one of N and M is greater than 1.

10. An apparatus for performing a discrete cosine transform (DCT) on a video signal, wherein the video signal includes a plurality of N×M image blocks, N and M being a positive integer, the apparatus comprising:

input means for receiving the video signal in a block by block basis;

discrete cosine transform (DCT) means for receiving each image data block from the input means and conducting a discrete cosine transform/inverse discrete cosine transform (DCT/IDCT) operation on the received image data block to generate a transformed image data block containing N×M pixel values;

zero input detect means for determining whether pixel values of a current image data block are all "0" and generating a detection signal in order to bypass the discrete cosine transform/inverse discrete cosine transform (DCT/IDCT) performing on the current image block; and output means for outputting the transformed image data block as a transformed video signal;

wherein the input means includes:

multiplex means for receiving said each image data block as a serial data by selecting from a serial data of a new image data block from external or a serial data of the transformed image data block fed back from the output means;

first conversion means for converting the serial data received from the multiplexing means to parallel data; and storage means for loading and temporarily storing the parallel data outputted from the first conversion means in parallel; and wherein the discrete cosine transform means includes:

first temporary storage means for temporarily storing the parallel data outputted from the storage means for performing the discrete cosine transform (DCT) operation;

reorder IDCT means for readjusting an order of the parallel data outputted from the first temporary storage means for performing the inverse discrete cosine transform (IDCT) operation;

first serial addition means for adding the parallel data outputted from the first temporary storage means for the DCT operation;

distributed arithmetic means for conducting distributed arithmetic operation on the parallel data outputted from the reorder IDCT means and the serial addition means;

second temporary storage means for temporarily storing the processed data outputted from the distributed arithmetic means;

reorder DCT means for readjusting an order of the data outputted from the second temporary storage means for the DCT operation;

second serial addition means for adding the data outputted from the second temporary storage means for the IDCT; and rounding means for rounding off the data outputted from the reorder DCT means and the second serial addition means.

11. The apparatus as recited in claim 10, wherein the output means includes:

a second conversion means for receiving a transformed image data block from the discrete cosine transform (DCT) means and for converting the parallel data outputted from the operation means to serial data;

a transposition data storage means for receiving the serial data from the second conversion means, transpositioning and storing the serial data outputted from the second conversion means to generate the video signal; and a rounding and clipping means for rounding off and clipping the serial data outputted from the second conversion means to generate the video signal.

12. The apparatus as recited in claim 10, wherein the distributed arithmetic means includes:

IDCT means for receiving the parallel data from the reorder IDCT means and the detection signal from the zero input detect means and for either performing an inverse discrete cosine transform (IDCT) operation on the received image data or bypassing the inverse discrete cosine transform (IDCT) operation performing on the received parallel data according to the received detection signal;

data processing means for receiving the processed image data, which is either transformed image data or bypassed image data, from the IDCT means, processing the received image data to be suitable to the DCT/IDCT operation; and a control means for controlling the distributed arithmetic module.

13. The apparatus as recited in claim 12, wherein said IDCT means performs the IDCT on the received parallel data when the zero detect means determines the received parallel data containing not all "0" bits and does not perform the IDCT on the received parallel data when the zero detect means determines the received parallel data containing all "0".

14. The apparatus as recited in claim 12, wherein the data processing means further includes:

a delay means for delaying time in case the calculation of the IDCT means cannot be performed within a predetermined clock;

a half addition means for receiving and half-adding the output data of the IDCT means and the final output data of the distributed arithmetic means; and a storage means for temporarily storing the data outputted from the half addition means.

15. The apparatus as recited in one of claim 12, wherein the IDCT means further includes a ROM, a multiplexing (MUX) circuit, a circuit for 1's complement and a whole adder, and reads data from the ROM and sum them up.

* * * * *